(12) United States Patent
Lee et al.

(10) Patent No.: US 7,646,332 B2
(45) Date of Patent: Jan. 12, 2010

(54) METHOD AND APPARATUS FOR INTERLEAVED GRIDDING IN DISTRIBUTED MULTIPLE COMPUTING FOR REAL-TIME RCS PREDICTION

(75) Inventors: Chul J. Lee, Lexington, MA (US); Sean T. Price, Marlborough, MA (US)

(73) Assignee: Raytheon Company, Waltham, MA (US)

( * ) Notice: Subject to any disclaimer, the term of this patent is extended or adjusted under 35 U.S.C. 154(b) by 72 days.

(21) Appl. No.: 11/889,197

(22) Filed: Aug. 9, 2007

(65) Prior Publication Data

US 2009/0040096 A1  Feb. 12, 2009

(51) Int. Cl.
 *G01S 13/00* (2006.01)
(52) U.S. Cl. .......................................... 342/90; 342/92
(58) Field of Classification Search .................... 342/92
 See application file for complete search history.

(56) References Cited

U.S. PATENT DOCUMENTS

| | | |
|---|---|---|
| 4,123,165 A | 10/1978 | Brown et al. |
| 4,373,808 A | 2/1983 | Pell et al. |
| 5,086,396 A | 2/1992 | Waruszewski, Jr. |
| 5,096,281 A | 3/1992 | Windebank et al. |
| H1181 H | 5/1993 | Rihaczek |
| 5,227,801 A | 7/1993 | Pierce |
| 5,305,430 A | 4/1994 | Glassner |
| 5,317,689 A | 5/1994 | Nack et al. |
| 5,355,442 A | 10/1994 | Paglieroni et al. |
| 5,392,050 A | 2/1995 | Guerci et al. |
| 5,583,975 A | 12/1996 | Naka et al. |
| 5,588,032 A | 12/1996 | Johnson et al. |
| 5,594,844 A | 1/1997 | Sakai et al. |
| 5,616,031 A | 4/1997 | Logg |
| 5,933,146 A | 8/1999 | Wrigley |
| 5,953,722 A | 9/1999 | Lampert et al. |
| 6,005,916 A | 12/1999 | Johnson et al. |
| 6,031,542 A | 2/2000 | Wittig |
| 6,212,132 B1 | 4/2001 | Yamane et al. |
| 6,750,805 B1 | 6/2004 | Cameron |
| 6,750,859 B2 | 6/2004 | Sowizral et al. |
| 6,924,763 B2 | 8/2005 | Poullin |
| 6,941,303 B2 | 9/2005 | Perrizo |

(Continued)

OTHER PUBLICATIONS

Ling, H.; Chou, R.-C.; Lee, S.-W.; Shooting and bouncing rays: calculating the RCS of an arbitrarily shaped cavity Feb. 1989; Antennas and Propagation, IEEE Transactions on vol. 37, Issue 2, pp. 194-205.*

(Continued)

*Primary Examiner*—Thomas H Tarcza
*Assistant Examiner*—Timothy A Brainard
(74) *Attorney, Agent, or Firm*—Daly, Crowley, Mofford & Durkee, LLP

(57) ABSTRACT

Apparatus and method for real-time determination of radar cross sections is disclosed using interleaved gridding. Radar cross section calculations are amenable to an implementation on parallel processors wherein the shooting window is subdivided into smaller areal units that are assigned to the parallel processors in an alternating fashion, such that the calculations performed by a single processor are not localized to a single area of the shooting window.

As further disclosed, the shooting and bouncing ray technique for calculating radar cross sections is implemented using the apparatus and method disclosed herein.

16 Claims, 5 Drawing Sheets

U.S. PATENT DOCUMENTS

| | | | |
|---|---|---|---|
| 7,123,548 | B1 | 10/2006 | Uzes |
| 7,289,118 | B2 | 10/2007 | Schmittler et al. |
| 7,348,975 | B2 | 3/2008 | Reshetov et al. |
| 7,535,408 | B2 | 5/2009 | Kuhn |
| 2002/0060784 | A1* | 5/2002 | Pack et al. .................. 356/6 |
| 2002/0075260 | A1 | 6/2002 | Brokenshire et al. |
| 2002/0087858 | A1 | 7/2002 | Oliver et al. |
| 2003/0011519 | A1* | 1/2003 | Breglia et al. ......... 343/700 MS |
| 2003/0022395 | A1* | 1/2003 | Olds ............................. 438/3 |
| 2005/0138073 | A1 | 6/2005 | Zhou et al. |
| 2008/0132174 | A1 | 6/2008 | Corral et al. |
| 2009/0040098 | A1 | 2/2009 | Lee et al. |

OTHER PUBLICATIONS

U.S. Appl. No. 12/212,779, Chul J. Lee et al., filed Sep. 18, 2008, 36 pages.

U.S. Appl. No. 12/212,783, Chul J. Lee et al., filed Sep. 18, 2008, 40 pages.

U.S. Appl. No. 12/212,786, Chul J. Lee, filed Sep. 18, 2008, 40 pages.

PCT Patent Application No. PCT/US2008/072434, Chul J. Lee et al., filed on Aug. 7, 2008, 30 pages.

U.S. Appl. No. 11/889,198, Chul J. Lee et al., filed Aug. 9, 2008, (Ref. No. 06E131), 14 pages.

PCT Patent Application No. PCT/US2008/072433, Chul J. Lee et al., filed on Aug. 7, 2008, 31 pages.

U.S. Appl. No. 12/138,711, Chul J. Lee et al., filed Jun. 13, 2008, 27 pages.

U.S. Appl. No. 12/138,814, Chul J. Lee et al., filed Jun. 13, 2008, 30 pages.

U.S. Appl. No. 12/212,787, Chul J. Lee et al., filed Sep. 18, 2008.

Notification of Transmittal of the International Search Report and the Written Opinion of the International Searching Authority, or the Declaration, PCT/US2008/072433 dated Feb. 24, 2009.

Lozano L et al: "Improvements in Ray-Tracing Acceleration Techniques to Compute Diffraction Effect and Doubles and triples Effects in the RCS Prediction of Complex Targets", Antennas and Propagation Society Symposium, 2005. IEEE Washington, DC, Jul. 3-8, 2005, Piscataway, NJ: IEEE, US, vol. 3A, Jul. 3, 2005, pp. 93-96, XP010859931, ISBN: 978-0-7803-8883-3, the whole document.

Schmitz J L et al: "Zpatch. A high frequency bistatic signature prediction code", Radar Conference, 1997, IEEE National Syracuse, NY, USA May 13-15, 1997, NewYork, NY, USA, IEEE, US, May 13, 1997, pp. 232-236, XP010224774, ISBN: 978-0-7803-3731-2, the whole document.

Yu C L et al: "Radar cross section computation and visualization by shooting-and-bouncing ray (SBR) technique", Proceedings of the antennas and Propagation Society International Symposium (APSIS). Chicago, Jul. 20-24, 1992; [Proceedings of the Antennas and Propagation Society International Symposium (APSIS)], New York, IEEE, US, vol. -, Jul. 18, 1992, pp. 1323-1326, XP010065787, ISBN: 978-0-7803-0730-8, the whole document.

Savides T et al: "Radar simulation using the shooting and bouncing ray technique" CCECE 2003. Canadian Conference on Electrical and Computer Engineering, Montreal, Canada, May 4-7, 2003; [Canadian Conference on Electrical and Computer Engineering], New York, NY, IEEE, US, vol. 1, May 4, 2003, pp. 307-310, XP010653888, ISBN: 978-0-7803-7781-3, the whole document.

Ozturk A K: "Implementation of Physical Theory of Diffraction for Radar Cross Section Calculations", The Institute of Engineering and Sciences of Bilkent University, in Partial Fulfillment of the Requirements for the Degree of Master of Science, Jul. 2002, 72 pages.

Shore R A, Yaghjian A D: "Application of incremental length diffraction coefficients to calculate the pattern effects of the rim and surface cracks of a reflector antenna", Antennas and Propagation Society International Symposium, 1993, AP-S Digest, pp. 1350-1353.

C. Ozdemir, R. Bhalla, H. Ling, "Fast ASAR Imag Formation Using the Shooting and Bouncing Ray Technique", IEEE Antennas and Propagation Society International Symposium, vol. 4, pp. 2605-2608, Jul. 13-18, 1997.

T.B. Hansen, "Corner Diffraction Coefficients for the Quarter Plate", IEEE transactions on Antennas Propagation, vol. 39, No. 7, pp. 976-984, Jul. 1991.

R.A. Shore, A.D. Yaghjian, "Application of Incremental Length Diffraction Coefficients to Calculate the Pattern Effects of the Rim and Surface Cracks of a Reflector Antenna", IEEE Antennas and Propagation Society International Symposium, 1993.

Havran V: "Heuristic Ray Shooting Algorithms", PhD thesis, Czech Technical University in Prague, Nov. 2000, 220 pages.

Ufimtsev, P. Ya., "Diffraction of Plane Electromagnetic Waves By A Thin Cylindrical Conductor", Radio Eng. Electron Phys., vol. 7, pp. 241-249, 1962.

Pathak et al., "Model, Ray, and Beam Techniques for Analyzing the EM Scattering by Open-Ended Waveguide Cavities", IEEE Transaction on Antennas and Propagation, vol. 37, No. 5, May 1989, pp. 635-647.

Pathak et al., "An Efficient Hybrid FE-BI-TW-Collective Ray Formulation for Analysis of Large Conformal Arrays", 2008 Union Radio Scientifique Internationale—(URSI) General Assembly, Aug. 7-16, 2008, 4 pages.

Oguzer et al., "On the Elimination of Infinities in the PO Component of Equivalent Edge Currents", Wave Motion, vol. 18, pp. 1-10, 1993.

Prabhakar H. Pathak, "High-Frequency Techniques for Antenna Analysis", Proceedings of the IEEE, vol. 80, No. 1, Jan. 1992, pp. 44-65.

Book, Edited by Andrew S. Glassner, "An Introduction to Ray Tracing", U.S. Edition Published by Academic Press, 1989, 329 pages.

Steve Kosanovich, "Fundamentals of Xpatch", Training Class Manual, SAIC Demaco, Apr. 28, 2008.

Antenna Handbook, vol. I Fundamentals and Mathematical Techniques; P.H. Pathak, Ohio State University ElectroScience Laboratory; Edited by Y.T. Lo and S.W. Lee; Chapter 4, pp. 4-1-4-110, Van Nostrand Reinhold, New York, 1993.

File downloaded from PAIR for U.S. Appl. No. 11/889,198, filed Aug. 9, 2007, file through May 26, 2009, 66 pages.

Notification of Transmittal of the International Search Report and the Written Opinion of the International Searching Authority, or the Declaration, PCT/US2008/072434 dated Feb. 6, 2009.

Walker et al., "Parallel Computation of Time-Domain Integral Equation Analyses of Electromagnetic Scattering and RCE", IEEE Transactions on Antennas and Propagation, IEEE Service Center, Piscataway, NJ, vol. 45, No. 4, Apr. 1, 1997, XP011002960, ISSN: 0018-926X, pp. 614-619.

Ngoly et al., "Parallel Post-Processing Techniques for Fast Radar Cross-Section Computation", 2006 $12^{th}$ Biennial IEEE Conf. on Electromagnetic Field Computation, Apr. 30, 2006, p. 377.

Jin-Lin Hu Et al, "RCS Computation of Jet Engine with Complex Termination Based on Multiplaten Z-buffer Algorithm", Microwave Conf., 1999 Asia Pacific Singapore, Nov. 30-Dec. 3, 1999, Picscataway, NJ, USA, IEEE, Nov. 30, 1999, XP010374299, ISBN: 978-0-7803-5761-7, pp. 781-784.

Ling, H.; Chou, R.-C.; Lee, S.-W.; Shooting and bouncing rays: calculating the RCS of an Arbitrarily Shaped Cavity, Feb. 1989; Antennas and Propagation, IEEE Transactions on vol. 37, Issue 2, pp. (2): 194-205.

Real-time radar cross section of complex targets by physical optics graphical processing; Rius, J.M.; Ferrando, M.; Antennas and Propagation Society International Symposium, 1990, AP-S. "Merging Technologies for the 90's". Digest. May 7-11, 1990 pp. 1280-1283 vol. 3.

Xpatch 4: the next generation in high frequency electromagnetic modeling and simulation software; Andersh, D.; Moore, J.; Kosanovich, S.; Kapp, D.; Bhalla, R.; Kipp, R.; Courtney, T.: Nolan, A.; German, F.; Cook, J.; Hughes, J.; Radar Conference, 2000. The Record of the IEEE 2000 International.

3D scattering center extraction from Xpatch, Bhalla, R. Hao Ling, Dept. of Electr. & Comput. Eng., Texas Univ., Austin, TX; Antennas and Propagation Society International Symposium, 1995. AP-S. Digest, Jun. 18-23, 1995, vol. 4, On pp. 1906-1909 vol. 4, Jun. 18, 1995-Jun. 23, 1995.

* cited by examiner

METHOD AND APPARATUS FOR INTERLEAVED GRIDDING IN DISTRIBUTED MULTIPLE COMPUTING FOR REAL-TIME RCS PREDICTION

BACKGROUND

The present invention relates to method and apparatus for the real-time computation of radar cross sections in a distributed multiple computing system.

Radar has found many uses since its invention nearly 100 years ago. It can be used for relatively simple tasks such as detecting an approaching airplane at an airport or more complex tasks such as imaging a planet's surface from orbit or even from another planet. As a matter of national defense; radar can also be used to detect and subsequently identify approaching targets such as planes and missiles.

Operationally, radar systems use a transmitter to generate and radiate a radar beam in a preferred direction. Known various technologies, mechanical and electronic, exist for steering the beam such that the beam can cover a defined area of the sky. Reflections of the radar signal from an object will be received by a receiver and processed to yield desired information, such as the discrimination between decoy and real targets.

Identification of an object of interest, as opposed to simple detection of the object's presence, can be a computer intensive activity. One known technique for identifying an object based upon the returned radar signal is known as the "shooting-and-bouncing-rays" (SBR) method. Elaboration on the methodology is unnecessary here. Information on SBR methodology can be found in numerous sources, including the original paper on the technique, "Shooting and Bouncing Rays: Calculating the RCS of an Arbitrarily Shaped Cavity," IEEE Transactions on Antennas and Propagation, Vol. 37, No. 2, (February 1989). Suffice it to say for purposes of this application that this technique enables the calculation of the radar cross-section (RCS) of an object of interest, from which the object itself can be determined.

As noted, the calculation of the RCS using the SBR method is computer intensive, meaning, of course, that its usefulness in situations where an RCS must be determined rapidly can be limited. For example, where there exists a plurality of approaching objects, such as real and dummy missile warheads, it is critical that the real be discriminated from the dummy so that the appropriate defensive countermeasures can be undertaken. A real-time computation of RCS in such situations is desirable to enable the use appropriate and effective defensive countermeasures. Using ever-more powerful computer processors can aid in speeding up this discrimination, but not to the extent desired or necessary.

To further enhance the rapidity with which object discrimination is accomplished a distributed computing system can be used. Such systems take advantage of a plurality of processors and software that divides the calculation between the various processors. The processors could be in individual personal computers interconnected over a local area network or could all be located within a single machine and appropriately connected.

Increasing the number of processors doing an RCS calculation will not necessarily increase the speed of such calculations, that is, the time to finally calculate the RCS, since the calculation can be slowed by an unequal distribution of the calculation workload between the processors. Thus, there exists a need for a method and apparatus for more equally distributing the workload between a plurality of processors performing RCS calculations.

The present invention, as well as its various features and advantages, will become evident to those skilled in the art when the following description of the invention is read in conjunction with the accompanying drawings as briefly described below and the appended claims. Throughout the drawings, like numerals refer to similar or identical parts.

DETAILED DESCRIPTION

What follows hereafter is a description of a novel, non-obvious, and useful method of load balancing a parallel implementation of a shooting window by alternating the assignment of work units from the shooting window to parallel processors. In various embodiments, there is disclosed a method for performing RCS generation, in parallel across a plurality of microprocessors, such that the assignment of adjacent sub-units of the shooting window to the same processor is avoided. Furthermore, there is disclosed a division of work performed by the parallel processors wherein the smallest sub-components of the shooting window are assigned to the processing units in an alternating fashion along the horizontal axis of the shooting window or in an alternating fashion along the vertical axis or in an alternating fashion on both the horizontal and vertical axis simultaneously. There is further disclosed method and apparatus for performing RCS generation by subdividing the shooting window into smaller areal subunits or cells and, assigning non-contiguous subunits or cells to a processor in the manner heretofore and hereafter described.

Figure 1:
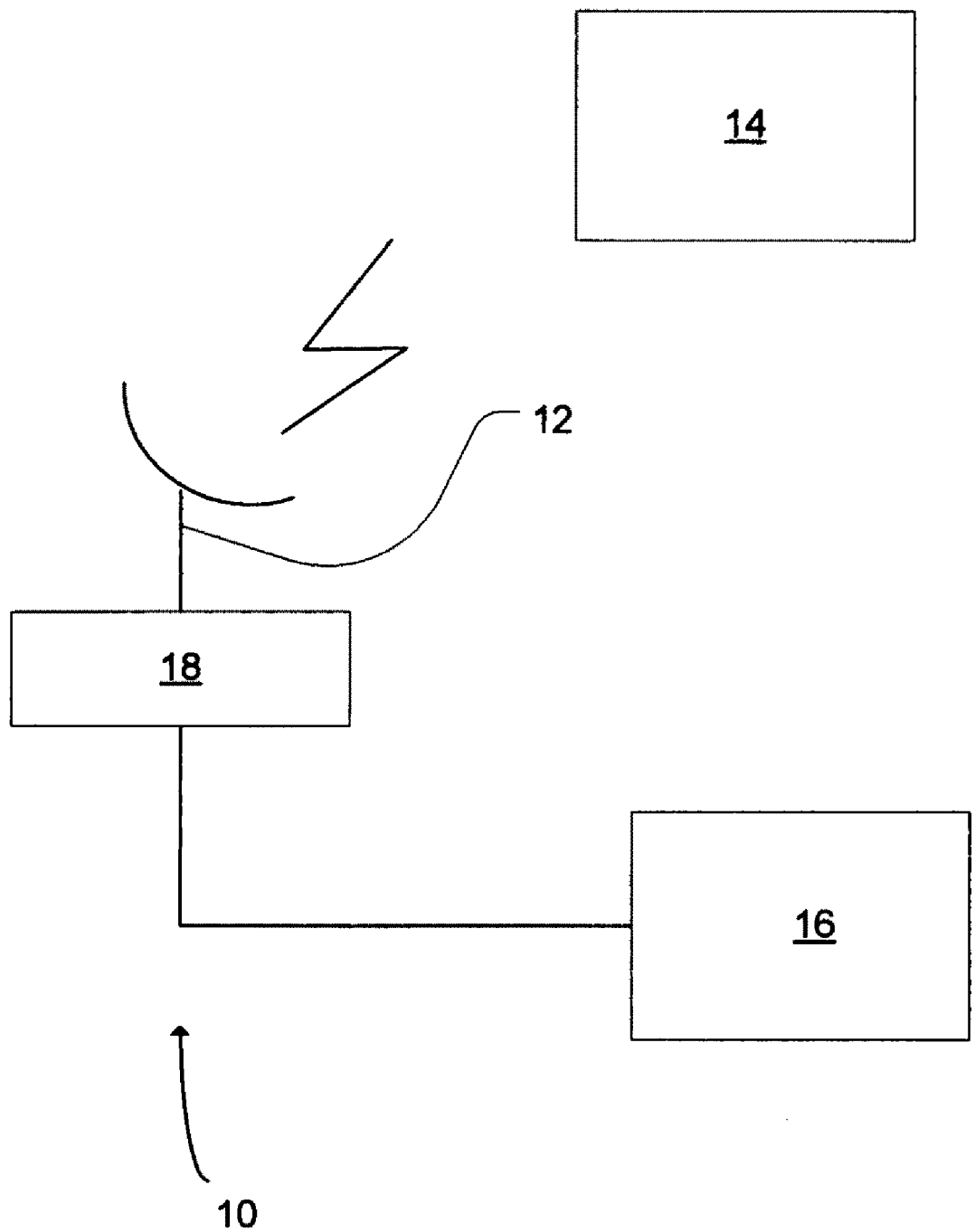
FIG. 1 schematically depicts a radar system.

FIG. 1 schematically depicts a radar system 10 including a transmitter and a receiver, or transceiver (not shown). The transmitter in the system 10 generates a radar beam 12 comprising a plurality of individual pulses or signals that are swept across a predetermined area or "shooting window" 14 of the sky. When a radar pulse encounters an object a portion of the pulse may be reflected back to the system and detected by the radar receiver. The detected reflected radar pulses are appropriately filtered and amplified and provided to a processing system 16.

Figure 2:
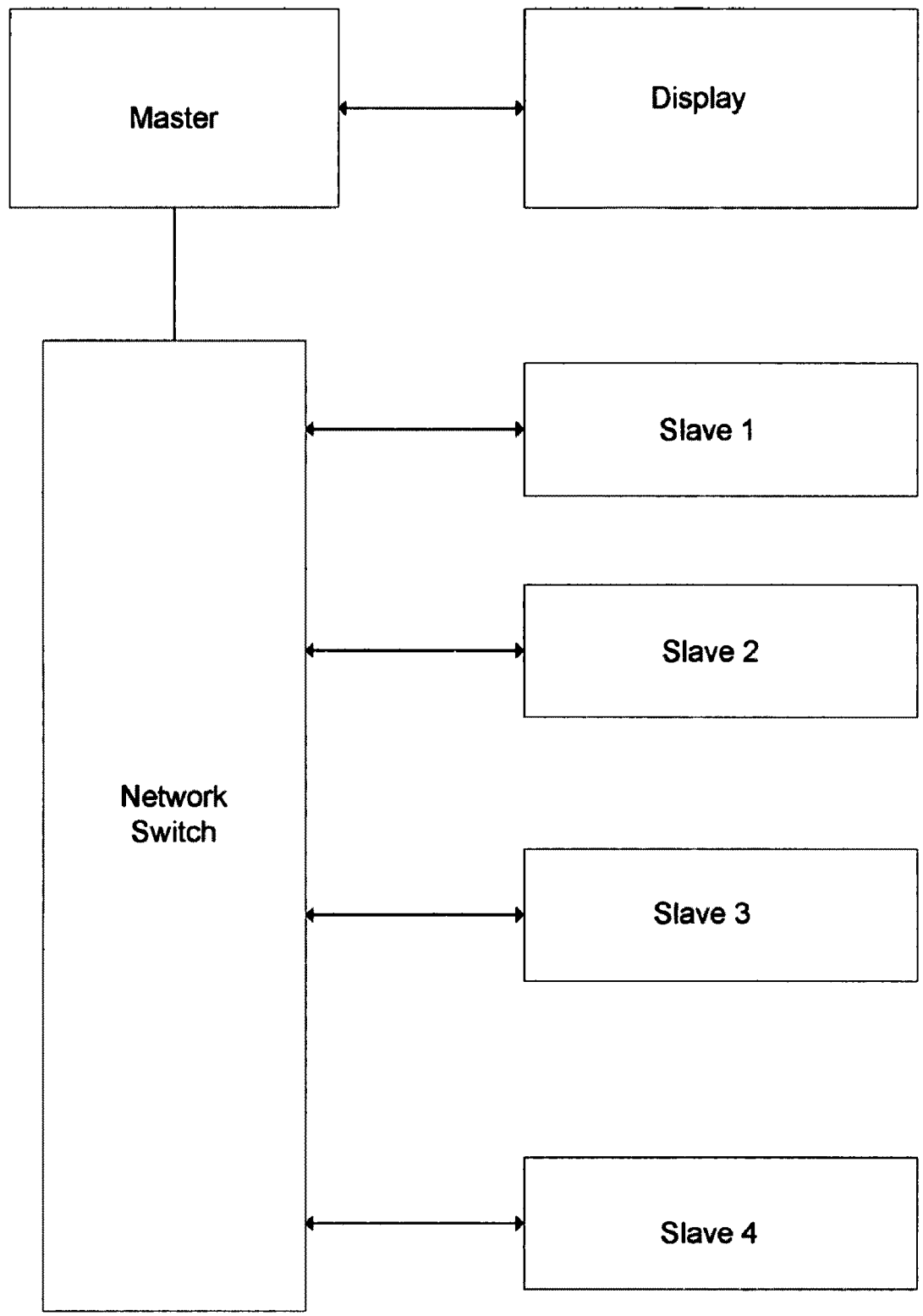
FIG. 2 schematically illustrates a distributed computing system.

FIG. 2 illustrates in schematic form a distributed computing or processing system 16 comprising a master computer 20, a display 22, a network 24, and a plurality n of slave processors $24_i$ for i=1 to n. As shown, the processors may take the form of personal computers interconnected by local area network 22. It will be understood, however, that the system 16 could also comprise a parallel computer including a plurality of interconnected processors.

Figure 3:
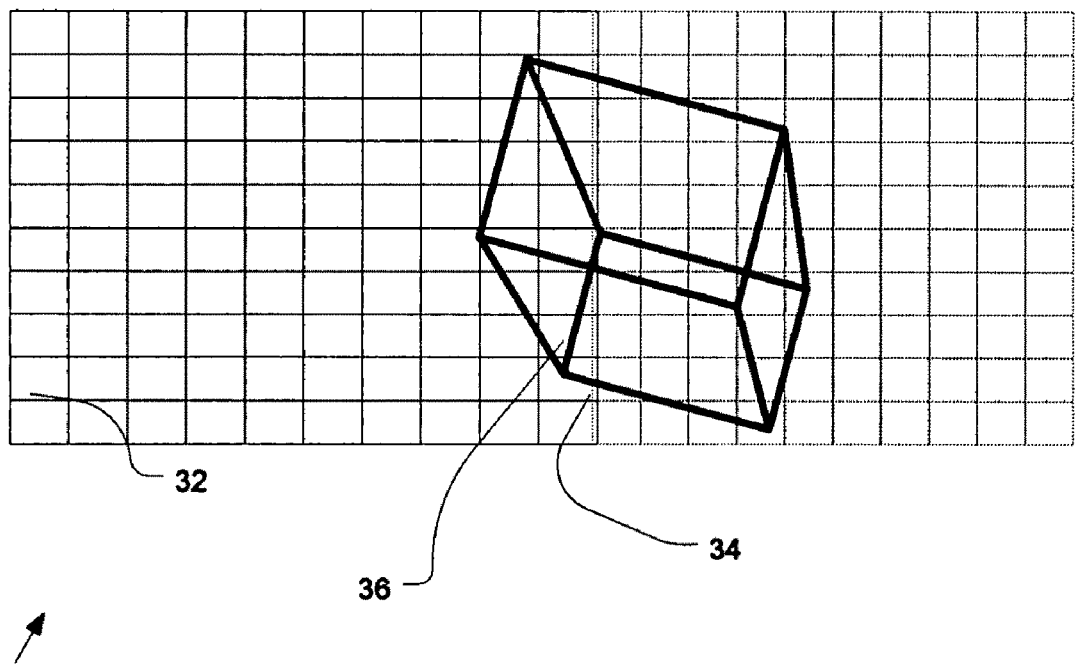
FIG. 3 illustrates a section of the sky being scanned by a radar system and illustrates the prior art method of allocating the data to a computing system.

The raw RCS data—the reflected, received, and filter and amplified, radar return signals—is provided to the system 16 for processing to calculate an RCS of an object or objects of interest. As shown in FIG. 3, in prior art calculations of a RCS the shooting window 14 of the sky illuminated by the radar signals would be divided into a grid composed of j cells where j was equal to the number of processors being used to calculate the RCS of any object or objects in the scanned area. That is, the data from a particular cell j would be sent to the $n_j$ processor for calculations.

The problem with the prior art method of distributing the data load between the n processors is that any the reflected radar signals from any particular cell j may be substantially greater or less than other cells j. During the processing of the information to calculate the RCS of objects of interest then, the processors n will finish calculating their share of data at different times. Since the ability to determine a RCS is dependent upon calculation of all or at least a proportion of the data, the time do complete such a calculation is generally equal to the time it takes to process the data. If one processor is overloaded with data, then, that time may be significant and thus impair the effort to provide a real-time calculation. More specifically, in the data distribution scheme shown in the FIG. 3, it is presumed that the object of interest illustrated here as a cube in a perspective view would return 40 reflected radar signals (or rays in the SBR analysis methodology). The gray shaded thread is loaded with 34 rays which it must process to yield part of the RCS for the object, and the clear shaded thread is loaded with 6 rays to process to yield the remaining part of the RCS. Therefore, this methodology of unbalanced data loading will result in an idle processor receiving the data from the clear grid area until the processor receiving data from the gray shaded area finishes computation. This has two undesirable consequences: first, the idle processor reduces computational efficiency; and second, the computation of the final result, the RCS, is delayed undesirably.

Figure 4:
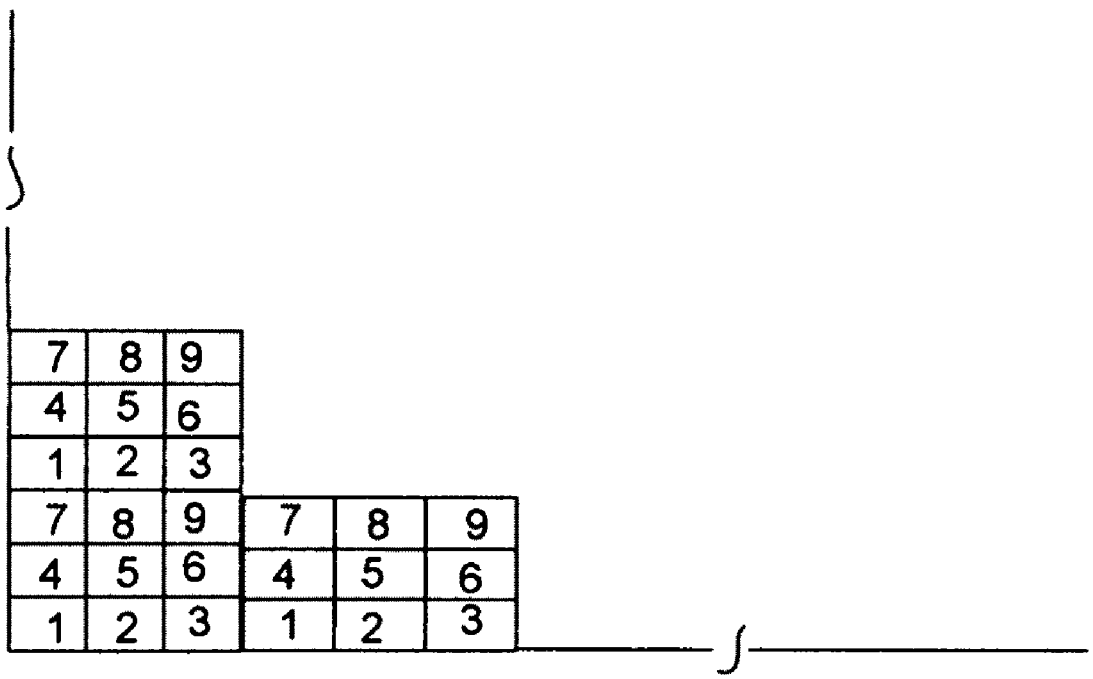
FIG. 4 illustrates an interleaved gridding system for use in real-time computation of RCS.

FIG. 4 illustrates a method of distributing the data, and thus the processing load, between the processors in a manner that will reduce overall RCS calculation time, thereby enabling real-time or nearly real-time processing of an RCS. As seen in FIG. 4, the subgrids j in the shooting window grid are each further subdivided into a plurality of subcells k equal to a whole number multiple greater than 1 of the number of processors n. Stated otherwise, this shooting window grid comprised of j cells would be divided into subcells k equal in number to some multiple number of processing threads allocated to the grid processing task. As illustrated in FIG. 4 the grid subdivision is shown for a distributed computing cluster of nine personal computers or nine processors. It will be understood, of course, that the cluster could be composed of any number of processors and that the shooting window would be divided up accordingly.

More specifically, the interleaved gridding scheme illustrated in FIG. 4 subdivides the complete shooting window grid into smaller areal units—subgrids. The size of a subgrid will be generally equal to the size of the shooting window grid divided by number of processing threads allocated to the processing task.

The subgrids are then further subdivided into subcells. Subcells are then created by assigning a single point from each subgrid of the shooting window grid to the corresponding sub-grid. The pattern of interleaved subcells is determined by the number of allocated processing threads; for example, if four threads are needed a subgrid having a 2×2 subcell configuration will be used and if nine threads are needed a 3×3 subcell configuration will be used.

To recreate the shooting window the points of the sub-grids must be interleaved.

The reflected radar pulse data from a particular subcell is then sent to its assigned parallel computation processor.

This type of grid division improves processing efficiency by providing a balanced load to all threads. The processing load for processing a set of rays according to SBR methodology is driven by the number of returned radar pulses or rays that collide with objects. The distribution of rays in an interleaved fashion ensures an equal or more equal number of rays resulting in bounces are distributed between the plurality of processors. As shown with FIG. 3, other known methods of ray distribution result in large numbers of bounced rays computed by one thread while another thread has few bounced rays. The result is idle processor time and analysis delays. Stated succinctly, the interleaved scheme divides the work of an entire shooting window of rays substantially equally between a plurality of processing units and thereby provides the equivalent efficiency of a single thread.

The assignment of the RCS signals to the processors can be accomplished in any one of several different manners. For example, the RCS signals from the subcells could be alternately assigned to the processors based upon the position of the subcells along the horizontal axis of the shooting window, along the vertical axis of the shooting window, or along both axes simultaneously. It will be understood that the size and number of the subcells can be determined consistent with the available processing power of the system 16.

Figure 5:
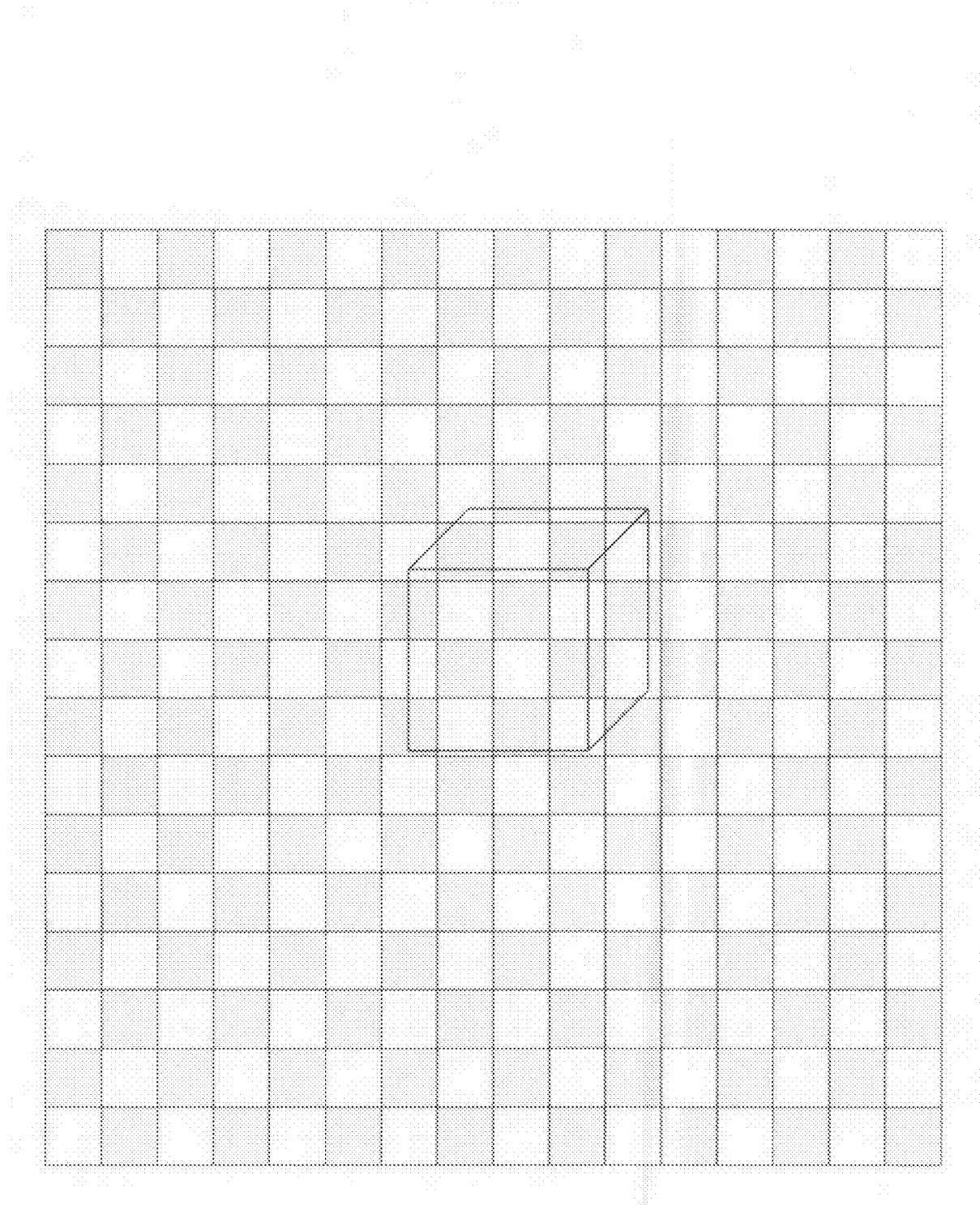
FIG. 5 illustrates by comparison with FIG. 4, the relatively improved load distribution provided by the method disclosed herein.

The method of allocating data shown in FIG. 4 will improve the efficiency of processing an RCS by providing a substantially balanced load to all of the threads. This improvement is shown in FIG. 5. By subdividing up the shooting window in subcells as discussed above, the interleaved scheme yields equal or substantially equal numbers of rays to compute for both processing threads. The interleaved scheme provides better load balancing than simple shooting window sub-division. Thus, processing threads are not idle during computation of the entire shooting window as with the prior art method shown in FIGS. 3 and 5.

Although the invention herein has been described with reference to particular embodiments, it is to be understood that these embodiments are merely illustrative of the principles and applications of the present invention. For example, while the SBR methodology of analyzing returned radar signals has been discussed, the methods described herein may be useful with other analysis techniques in existence or hereafter developed. In addition, while one example of a hardware configuration has been shown, it is understood that multiple configurations of parallel processing computation systems exist and that those other configurations could find use with the methods described herein. It is therefore to be understood that numerous modifications may be made to the illustrative embodiments and that other arrangements may be devised without departing from the spirit and scope of the present invention as defined by the appended claims.

What is claimed is:

1. A method comprising:
   determining in real-time a radar cross section (RCS) of an object, the determining comprising:
   defining a shooting window configured to be illuminated by radar signals;
   dividing the shooting window into a number of subgrids equal to a number of processing threads allocated to process the shooting window;
   dividing each of the subgrids into subcells equal to a whole number multiple greater than one of a number of parallel processors;
   illuminating the shooting window with radar signals;
   receiving radar signals reflected by the object within the shooting window; and
   assigning the reflected radar signals received from each subcell to a corresponding one of the parallel processors such that the assignment of parallel processors within a subgrid is evenly distributed amongst the parallel processors and such that the assignment of adjacent subcells to the same processor is avoided.

2. The method of claim 1 wherein the reflected radar signals are assigned to the parallel processors based upon the positions of the subcells along the horizontal axis of the shooting window.

3. The method of claim 1 wherein the reflected radar signals are assigned to the parallel processors based upon the positions of the subcells along the vertical axis of the shooting window.

4. The method of claim 1 wherein the reflected radar signals are assigned to the parallel processors based upon the positions of the subcells along the horizontal and vertical axes of the shooting window.

5. The method of claim 1 wherein the reflected radar signals of contiguous subcells are assigned to different processors.

6. The method of claim 1 wherein the parallel processors form a parallel computer.

7. The method of claim 1 wherein the parallel processors form a plurality of networked computers.

8. The method of claim 1 wherein the RCS is calculated using the shooting and bouncing ray technique.

9. A system for real-time RCS generation comprising:

a radar transceiver for generating radar signals and receiving radar signals reflected by an object within a predefined shooting window;

a processing system for processing the received reflected radar signals, said processing system comprising a plurality of parallel-connected processors;

wherein the system processes the received reflected radar signals by;

dividing the shooting window into a number of subgrids equal to a number of processing threads allocated to process the shooting window;

dividing each of the subgrids into subcells equal to a whole number multiple greater than one of a number of parallel processors; and assigning the reflected radar signals received from each subcell to a corresponding one of the parallel processors such that the assignment of parallel processors within a subgrid is evenly distributed amongst the parallel processors and such that the assignment of adjacent subcells to the same processor is avoided.

10. The system of claim 9 wherein reflected radar signals are assigned to the parallel processors based upon the positions of the subcells along the horizontal axis of the shooting window.

11. The system of claim 9 wherein the reflected radar signals are assigned to the parallel processors based upon the positions of the subcells along the vertical axis of the shooting window.

12. The system of claim 9 wherein the reflected radar signals are assigned to the parallel processors based upon the positions of the subcells along the horizontal and vertical axes of the shooting window.

13. The system of claim 9 wherein the reflected radar signals of contiguous subcells are assigned to different processors.

14. The system of claim 9 wherein the parallel processors form a parallel computer.

15. The system of claim 9 wherein the parallel processors form a plurality of networked computers.

16. The system of claim 9 wherein the RCS is calculated using the shooting and bouncing ray technique.

* * * * *

UNITED STATES PATENT AND TRADEMARK OFFICE
CERTIFICATE OF CORRECTION

| | | |
|---|---|---|
| PATENT NO. | : 7,646,332 B2 | Page 1 of 1 |
| APPLICATION NO. | : 11/889197 | |
| DATED | : January 12, 2010 | |
| INVENTOR(S) | : Lee at al. | |

It is certified that error appears in the above-identified patent and that said Letters Patent is hereby corrected as shown below:

Column 1, line 8 delete "to method" and replace with --to a method--.

Column 1, line 15 delete "defense;" and replace with --defense,--.

Column 1, line 48 delete "use appropriate" and replace with --use of appropriate--.

Column 2, line 8 delete "DRAWING" and replace with --DRAWINGS--.

Column 2, line 39 delete "disclosed method" and replace with --disclosed a method--.

Column 2, line 49 delete "object a" and replace with --object, a--.

Column 3, line 6 delete "any the" and replace with --any of the--.

Column 3, line 9 delete "the RCS of objects of interest then,..." and replace with --the RCS objects of interest--.

Column 3, line 13 delete "do" and replace with --to--.

Column 3, line 17 delete "in the FIG." and replace with --in FIG.--.

Column 3, line 51 delete "by number" and replace with --by a number--.

Column 4, line 4 delete "bounces are" and replace with --bounces that are--.

Column 4, line 10 delete "equally" and replace with --equal--.

Signed and Sealed this

Twenty-third Day of February, 2010

David J. Kappos
*Director of the United States Patent and Trademark Office*